(12) United States Patent
Ram

(10) Patent No.: US 8,611,395 B2
(45) Date of Patent: Dec. 17, 2013

(54) ADAPTIVE SPREADING, MODULATION, AND CODING

(75) Inventor: Uzi Ram, Givat Elah (IL)

(73) Assignee: Gilat Satellite Networks Ltd., Petah Tikva (IL)

( * ) Notice: Subject to any disclaimer, the term of this patent is extended or adjusted under 35 U.S.C. 154(b) by 186 days.

(21) Appl. No.: 13/023,653

(22) Filed: Feb. 9, 2011

(65) Prior Publication Data

US 2011/0194587 A1  Aug. 11, 2011

Related U.S. Application Data

(60) Provisional application No. 61/303,143, filed on Feb. 10, 2010.

(51) Int. Cl.
  *H04B 1/00* (2006.01)
(52) U.S. Cl.
  USPC ............ 375/133; 375/240; 370/316; 370/336
(58) Field of Classification Search
  USPC .......................... 375/133, 240; 370/316, 336
  See application file for complete search history.

(56) References Cited

U.S. PATENT DOCUMENTS

| | | | | |
|---|---|---|---|---|
| 6,510,172 | B1 * | 1/2003 | Miller | 375/140 |
| 7,346,069 | B2 * | 3/2008 | Lee et al. | 370/431 |
| 7,535,822 | B2 * | 5/2009 | Geile et al. | 370/208 |
| 8,208,499 | B2 * | 6/2012 | Sun et al. | 370/514 |
| 8,320,296 | B2 * | 11/2012 | Becker et al. | 370/316 |
| 2002/0191634 | A1 * | 12/2002 | Okamura et al. | 370/442 |
| 2004/0125784 | A1 * | 7/2004 | Lee et al. | 370/345 |
| 2004/0252725 | A1 * | 12/2004 | Sun et al. | 370/503 |
| 2006/0126576 | A1 * | 6/2006 | Dale et al. | 370/336 |
| 2006/0176843 | A1 * | 8/2006 | Gat et al. | 370/316 |
| 2007/0015460 | A1 * | 1/2007 | Karabinis et al. | 455/12.1 |
| 2007/0019605 | A1 * | 1/2007 | Rioux et al. | 370/347 |
| 2010/0128661 | A1 * | 5/2010 | Becker et al. | 370/316 |
| 2010/0195712 | A1 * | 8/2010 | Yu et al. | 375/240.01 |

FOREIGN PATENT DOCUMENTS

WO  2010059740  5/2010

OTHER PUBLICATIONS

Digital Video Broadcasting (DVB); Second Generation Framing Structure, Channel Coding and Modulation Systems for Broadcasting, Interactive Services, News Gathering and other Broadband Satellite Applications (DVB-S2); Final draft ETSI EN 302 307; vol. BC, No. V1.2.1, Apr. 1, 2009 XP014043755.
EP Search Report, EP 11 15 4084, Completion date May 17, 2011.

* cited by examiner

*Primary Examiner* — Daniel Washburn
*Assistant Examiner* — Berhanu Tadese
(74) *Attorney, Agent, or Firm* — Banner & Witcoff, Ltd.

(57) ABSTRACT

This invention presents methods for transmitting and receiving data via a satellite and satellite communication systems thereof. A transmitted signal may include a stream of transmission blocks, whereas each transmission block may differ from a previous transmission block by any of a spreading characteristic, an error correction code-rate characteristic and a modulation characteristic. In addition, any of the spreading, error correction code-rate and modulation characteristics may be changed in accordance with momentary reception conditions at a receiving station.

30 Claims, 2 Drawing Sheets

ADAPTIVE SPREADING, MODULATION, AND CODING

RELATED APPLICATIONS

The present application is a non-provisional of U.S. Patent Application No. 61/303,143, entitled "Adaptive Spreading, Modulation, and Coding," filed Feb. 10, 2010, the contents of which are incorporated herein by reference in their entirety for all purposes.

FIELD OF THE INVENTION

This invention pertains to the fields of satellite communication systems and methods. In particular, this invention pertains to satellite communication systems where adaptive transmission may be used.

BACKGROUND

Efficient use of space segment is a key factor in the business of communication via satellite. Over the last several years, much attention was given to improving the economics of interactive data networks over satellite.

In one example of an interactive data network over satellite, a central hub may communicate with multiplicity of remote terminals, for example, by transmitting a statistically multiplexed forward signal. For several reasons, the remote terminals often receive this forward signal at different signal to noise ratios (SNR). In many cases, the remote terminals may be dispersed over a large geographical area with uneven satellite illumination intensity or coverage. In some cases, some terminals may suffer from antenna pointing error and/or from rain attenuation, both may have negative impact on reception quality.

Several years ago, the Digital Video Broadcasting for Satellite (DVB-S) standard was presented. However, a forward signal (e.g. in an interactive data network over satellite) implemented using DVB-S may require additional power in order to have sufficient link margin for maintaining high link availability. Some years later, the DVB-S2 standard was introduced and with it the concept of adaptive coding and modulation (ACM). In the adaptive mode, data destined to a specific remote terminal may be modulated and coded (i.e. for error correction) in accordance with the momentary SNR of the forward signal as received at the destination remote terminal. According to the DVB-S2 standard, the transmitted signal is made up of a stream of blocks (Baseband Frames (BBFRAME)), where each block may be transmitted using a different combination of modulation and error-correction code-rate (often denoted as MODCOD). The remote terminals periodically communicate (e.g. over a return link) their forward link reception SNR to the central hub, allowing the data destined to them to be transmitted over the forward link using an optimal MODCOD. Consequently, there is no need to keep a global link margin according to worst case rain and/or reception conditions. At any given time the percentage of terminals that may experience a bad link is usually quite small hence the overall data throughput from the central hub to the remote terminals is maximized.

Small aperture antennas often have a low G/T (Gain over Temperature) property. Consequently, a remote terminal operating with a small aperture antenna may receive a forward link signal transmitted from a hub at an SNR too low for using DVB-S2 ACM. FCC (Federal Communication Commission) and ETSI (European Telecommunication Standard Institute) regulations limit EIRP (Effective Isotropically Radiated Power) per predefined frequency bandwidth at the satellite. In the United States for example, it is often not possible to receive a DVB-S2 ACM signal using a dish antenna of a diameter below approximately 30 centimeters without exceeding said EIRP density limitations. Moreover, small antennas have relatively wide beams, which may result in receiving interferences from neighboring satellites (i.e. satellites located in relative proximity to the satellite of interest). On the other hand, small antennas are popular in some applications, such as communication on the move, i.e. for mobile terminals. For a mobile terminal, using a small dish antenna may be a critical requirement, for example, due to aerodynamic considerations, weight considerations, availability of installation surface (like on a roof of a vehicle), cost, etc.

In order to allow reception of a signal at low and even at negative SNR levels, some satellite communication systems make use of spread-spectrum techniques. Spread-spectrum techniques allow transmission of a signal with sufficient energy per transmitted data bit (hence allowing reception of the signal with very low gain antennas and/or at very bad link conditions) while keeping the power spectral density (i.e. EIRP per bandwidth) at the satellite within the limits set by the applicable regulations. Using constant spectrum spreading techniques in combination with robust modulations, e.g. BPSK (Binary Phase-Shift Keying), may allow operation at very low SNR levels (e.g. −15 dB and in some cases even lower than that when using spreading factors above 15 dB).

However, where spreading is used (including in some embodiments of DVB-S2, such as that which is defined in EN 301790, version 1.5.1, section 5.1), the spreading factor is fixed, i.e. the same spreading factor is used for all the information being transmitted. Consequently, in point-to-multipoint applications, the forward signal may be inefficient, as it may be necessary to set the fixed spreading factor high enough in order to have enough spreading gain for demodulation at worst case reception conditions of any of the remote terminals, although typically only a small portion of these remote terminals may experience a bad link (due to rain, for instance). Similar inefficiency may also be experienced in point-to-point applications where operation at low SNR is needed.

It is important to note that optimal efficiency is typically achieved when the spreading factor is set to the minimal value yielding a spreading gain sufficient for demodulation at the lowest modulation constellation and the lowest coding rate supported by a terminal. Hence, in order to maximize forward channel throughput, data towards terminals with bad reception conditions may optimally be sent with a higher spreading factor than data towards terminals with better reception conditions.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In view of the above, aspects of the invention relate to an adaptive transmission method which allows operation at very low SNR levels.

In one aspect of the invention, a new waveform for transmitting information via a satellite is presented. The waveform may include a stream of blocks, whereas each block may be characterized by a spreading factor, a modulation type and a coding rate (i.e. an error correction code-rate). In addition, any of the spreading factor, the modulation type and the coding rate may differ between a first block and a second block transmitted over the same channel.

In another aspect of the invention, said new waveform may be used for sending a data packet over a satellite link using an optimal spreading factor, optimal modulation type and optimal error-correction code-rate, in accordance with momentary reception conditions at a receiving station.

In yet another aspect of the invention, determining the optimal spreading factor in accordance with momentary reception conditions at a receiving station may include selecting the minimal spreading factor necessary for demodulation of the signal at the receiving station, for at least the purpose of maximizing data throughput.

In further aspects of the invention, systems for communicating via a satellite using said new waveform are presented. Said systems may include point-to-point systems as well as point-to-multipoint systems.

BRIEF DESCRIPTION OF THE DRAWINGS

Certain embodiments are illustrated by way of example and not limited in the accompanying figures in which like reference numerals indicate similar elements and in which.

DETAILED DESCRIPTION

A satellite communication system may include a transmitting station and a receiving station, wherein the transmitting station may be configured to transmit a signal via a satellite to the receiving station, which in turn may be configured to receive the signal. Though in many cases the transmitting station and the receiving station are dispersedly located, in some embodiments the transmitting station and the receiving station may be co-located, for example components of a single earth station, e.g., a station in a point-to-point network, or a hub station or terminal station in a point-to-multipoint topology. In addition, the receiving station may receive the signal at varying SNR levels, including at very low and/or at negative SNR levels. In one aspect of the invention, said signal may be an Adaptive Spreading Coding and Modulation (ASCM) signal, for at least the purpose of improving (and potentially) maximizing throughput and bandwidth utilization efficiency. In some embodiments, the ASCM signal may have a waveform as described herein.

Figure 1:
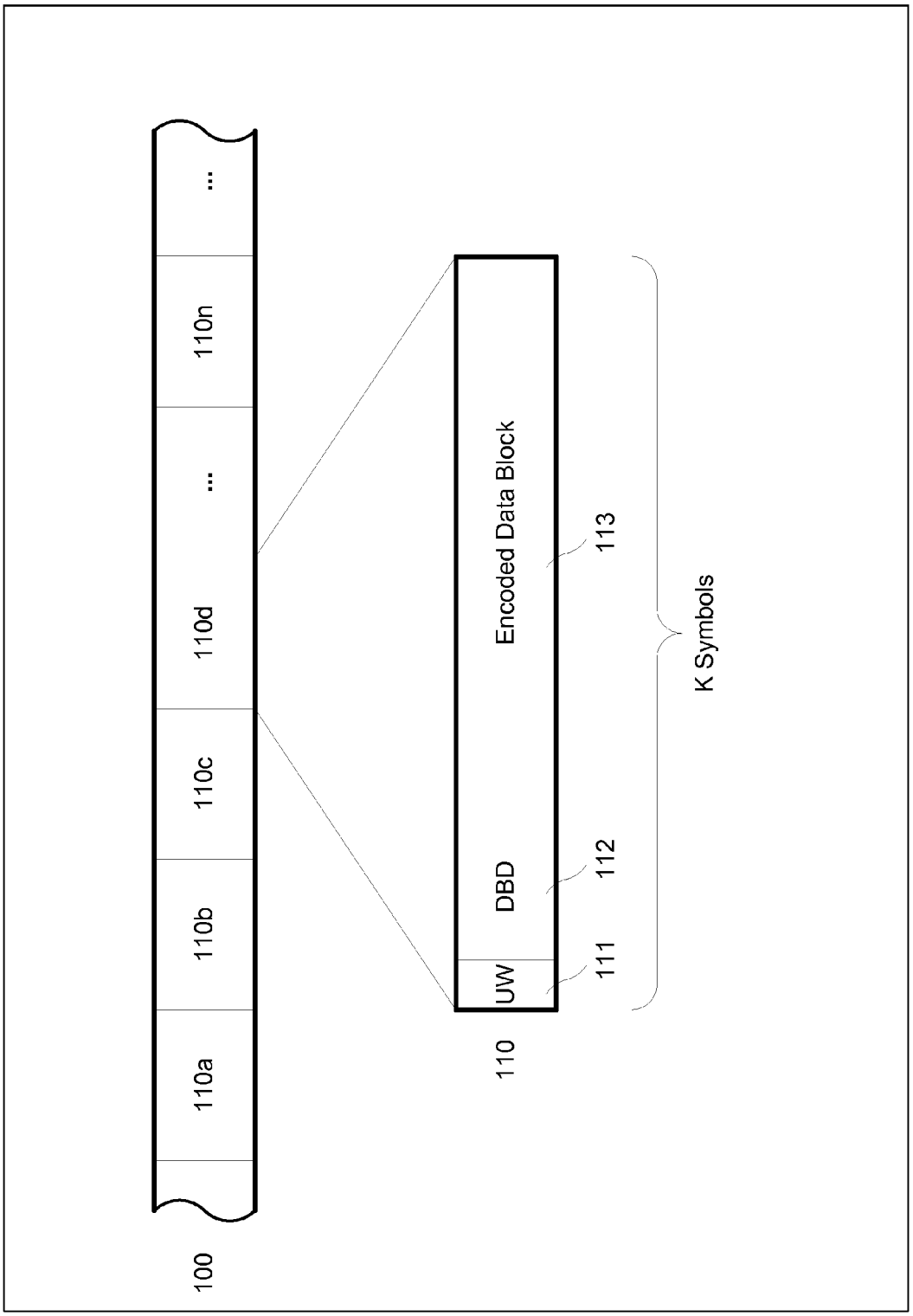
FIG. 1 shows an example format for an adaptive spreading coding and modulation waveform in accordance with aspects of the invention.

FIG. 1 shows a possible format of an ASCM waveform. An ASCM waveform may be applied to a continuous transmission 100 and may comprise a stream of transmission blocks, such as transmission blocks 110a to 110n. Each transmission block may be characterized by modulation characteristics and coding characteristics (i.e. an error-correction code-rate). If signal 100 has to be received at very low or at negative SNR levels, one or more transmission blocks may also have (spectrum) spreading characteristics. In some embodiments of the invention, spreading may be done by repetitions, i.e. by transmitting the same data N times in N transmission blocks in order to achieve a spreading gain of N (or 10*Log(N) for expressing the spreading gain in dB). In other embodiments of the invention, spreading gain may be achieved by using a direct sequence technique or any other applicable spreading technique.

In some embodiments of the invention, all transmission blocks (e.g. 110a to 110n) may be of constant length in term of transmitted symbols (e.g. K symbols as shown in FIG. 1) regardless of other characteristics, such as modulation characteristics, error-correction coding characteristics and/or spreading characteristics. Using transmission blocks of constant length may facilitate faster acquisition of an ASCM signal by a receiving station.

Further referring to FIG. 1, each transmission block (e.g. transmission block 110) may include a Unique Word (UW) field 111, a Data Block Descriptor (DBD) field 112 and an Encoded Data Block field 113.

UW field 111 may be used by a modem of a receiving station for at least the purposes of acquiring bit-timing synchronization and/or tracking changes in signal frequency (frequency offset tracking) In some embodiments, UW field 111 may be an optional field, i.e. it may be missing altogether form all transmission blocks 110, at least for the purpose of improving bandwidth utilization efficiency (i.e. by means of reducing the total overhead). Where UW field 111 is missing, bit-timing synchronization and/or frequency tracking information may take longer to acquire. In other embodiments, UW field 111 may comprise a constant word, for example of 64 predefined symbols.

Encoded data block 113 may include data bits modulated and encoded in accordance with modulation characteristics, coding (i.e. error correction code-rate) characteristics and spreading characteristics that may be indicated in Data Block Descriptor (DBD) field 112 preceding encoded data block 113 in the same transmission block. The data bits that may be included in encoded data block 113 may be encoded using a block error correction code. In some embodiments of this invention, the block error correction code may be a Low Density Parity Check (LDPC) code having an output block of a fixed number of symbols regardless of modulation and/or coding rate. Consequently, the number of encoded bits in an encoded data block 113 may change as modulation constellation changes. For example, an encoded data block 113 of 4000 symbols may include 8,000 encoded bits with QPSK modulation or 12,000 encoded bits with 8 PSK modulation.

Data Block Descriptor (DBD) field 112 may be used for signaling characteristics applicable to an encoded data block 113 immediately following DBD field 112 within the same transmission block. The signaled characteristics may include spreading characteristics and possibly also modulation characteristics and/or error correction coding characteristics, whereas each DBD code word may refer to different signal characteristics. In some embodiments, spreading characteristics may be signaled for all transmission blocks, even for those transmission blocks for which spreading is actually not used (i.e. the spreading factor is 1). In other embodiments, spreading characteristics may be signaled for a transmission block only if spreading may be used (i.e. if the spreading factor is higher than 1) in combination with specific MOD-CODs. In those embodiments, the lack of explicit signaling of spreading characteristics in combination with other MOD-CODs may imply that no spreading is used with those MOD-CODs, i.e. the lack of explicit spreading characteristics signaling may also be considered as spreading characteristics signaling.

In one example, 16 DBD codes may be sufficient for signaling 4 combinations (i.e. MODCODs) of high order modulation (e.g. 8 PSK) with some coding rates (i.e. error correction code-rates), and 7 combinations of low order modulation (e.g. QPSK) with same and/or other coding rates. In some embodiments of the invention, a communication system may support a large set of MODCODs and spreading attributes combinations. However, the communication system may be configured to map only a subset of these MODCODs and spreading attributes combinations into a relatively small number of DBD codes, for at least the purpose of increase the probability of successful DBD code detection. In yet additional embodiments, DBD codes may be signaled using orthogonal code words over a sequence of symbols. For example, 16 DBD codes may be signaled using 16 orthogonal code words over a sequence of 192 symbols. Using a set of orthogonal code words may allow detection of the DBD combination using a non-coherent detector (e.g. without knowledge of the signal's reference phase).

It should be appreciated by anyone skilled in the art that many deviations from the above described embodiment may be envisaged without departing from the true spirit and scope of the present invention. Such deviations may include (but not limited to) changes in any of the arrangement of MODCOD combinations (i.e. the number of modulation types, the modulation types themselves, the number of MODCOD combinations of each modulation type, etc), in the number of DBD codes and/or in the number of symbols to be used for DBD field 112.

There are many options for signaling spreading characteristics, modulation characteristics, and error correction coderate characteristics. In some embodiments of the invention, only some of the MODCOD combinations may be combined with spreading. For example, only one or two MODCOD combinations of a low order modulation (e.g. one with the lowest constellation) and with the lowest coding rates (e.g. 1/4 and 1/3 in case of two MODCOD combinations) may be combined with spreading. The number of MODCOD combinations that may be used in combination with spreading may be restricted in such a manner (e.g. to one or two lowest coding rate and lowest modulation constellation) without actual throughput degradation. Maximizing the number of bits per symbol (i.e. maximizing throughput) may require selection of a minimal spreading factor that may be required for insuring reception in combination with a lowest constellation modulation and a lowest coding rate that may be supported in a communication system. In other words, a robust MODCOD combination with a smaller spreading factor may be preferred over a higher order MODCOD combination with a higher spreading factor in order to maximize data throughput. In addition, such restriction leads to a lower number of combinations that may have to be represented by DBD field 112 (DBD codes).

In some embodiments, where spreading may be done by repetitions, the spreading characteristics indicated in DBD field 112 may indicate repetitions attributes. Each MODCOD combination that may be combined with repetitions may be associated with two DBD codes rather than with one. A first DBD code may indicate a MODCOD and also that the applicable encoded data block (i.e. the one included in the same transmission block) is a single replica but not the last one, i.e. that more (identical) replicas of this encoded data block should be expected by a receiving station. A second DBD code, which is different from the first DBD code, may indicate the same MODCOD as the first DBD code, but also that the applicable encoded data block (i.e. the one included in the same transmission block) is a last replica (i.e. no further replicas of the same encoded data block should be expected). This method for signaling repetitions attributes may be used for at least the purposes of maintaining a small number of DBD codes regardless of the number of repetition schemes used and/or for requiring no pre-knowledge from a receiving station regarding the number of repetition schemes and the number of repetitions in each scheme.

It should be appreciated by anyone skilled in the art that other options, for signaling repetitions attributes (or other attributes of different spreading techniques) as well as modulation and coding characteristics of an encoded data block, may be envisaged without departing from the true spirit and scope of the present invention.

Figure 2:
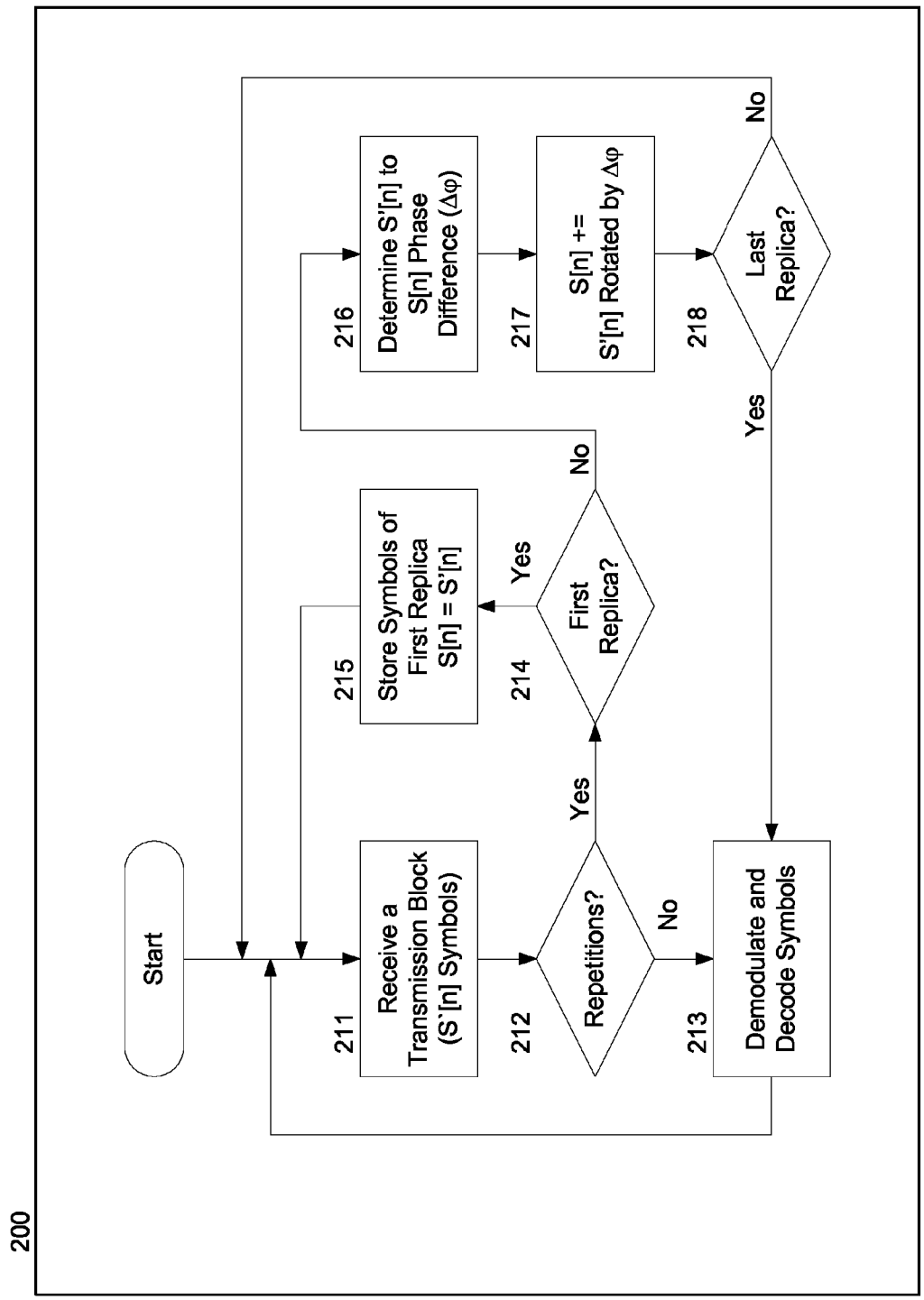
FIG. 2 shows an example flowchart of an algorithm for receiving an adaptive spreading coding and modulation waveform in accordance with aspects of the invention.

In some embodiments of the invention, repetitions may be processed by a receiving station in accordance with algorithm 200 as shown in FIG. 2. Upon receiving a transmission block (step 211), the receiving station may be configured to determine whether the block is part of a repetitions sequence (step 212). If the received transmission block is not part of a repetitions sequence, the encoded data block included in it may be demodulated and decoded for extracting the transmitted data (step 213). However, if the received transmission block is part of a repetitions sequence, the receiving station may be configured to further determine whether it includes a first replica of an encoded data block (step 214). If the received transmission block includes a first replica of an encoded data block, the receiving station may be configured to store symbol samples (step 215) corresponding to the first replica (S'[n]) in a memory device associated with the receiving station (S[n]) and then wait for subsequent replicas (step 211). Upon receiving another transmission block (step 211), determining that it is part of a repetitions sequence (step 212) and that it includes a replica which is not a first replica (step 214), the receiving station may be configured to further determine (e.g. by means of estimation) a phase difference (AO between the symbols of the newly received replica (S'[n]) and corresponding symbols (S[n]) represented by symbol samples already stored in memory (step 216). The receiving station may be configured to then coherently sum the symbols of the newly received replica with the (sampled) symbols already stored in memory (step 217), whereas coherent summation may be performed after eliminating the determined phase difference (AO between the corresponding symbols. The receiving station may be configured to rotate the phase of the symbols of the newly received replica (S'[n]) in accordance with the determined phase difference (e.g. by rotating symbol samples of the new replica in accordance with the determined phase difference) and then to sum symbol samples of the rotated replica with the corresponding symbol samples in memory (step 217). The receiving station may be further configured to then replace the stored symbol samples (S[n]) with the newly summed symbol samples (step 217). The receiving station may be configured to then determine whether additional replicas of the same encoded data block are to be expected (step 218). If more replicas are to be expected, the receiving station may be configured to wait for at least one more transmission block (step 211) and to perform the steps already described above, until reaching again the step of determining whether additional replicas are to be expected (step 218). If the last replica handled is indeed the last replica in the repetitions sequence of the same encoded data block, the encoded data block symbols, represented by the symbol samples stored in memory may have gained a processing gain in equivalent SNR (e.g. 10*Log(N) in dB, where N is the number of received replicas) and may be demodulated and decoded in accordance with an indicated MODCOD (step 213).

In some embodiments, the same spreading gain which may be gained for encoded data block 113 may be gained for DBD field 112 and UW field 111 as well. This may be achieved by first removing the modulation from the symbols corresponding to DBD field 112 and UW field 111 and then coherently summing the non-modulated symbols. Removal of the modulation from the symbols corresponding to DBD field 112 and UW filed 111 may be possible after determining the modulation used by detecting a DBD code included in DBD field 112 (e.g. by using a predefined number of correlators) and by having preliminary knowledge of the UW symbol sequence. The result of such processing may be an enhanced preamble, which may be used for establishing an initial phase reference for demodulation and/or detection of encoded data block 113 after gaining the spreading gain.

The following is an example of how data throughput may be improved (and potentially even maximized) using one of the principles described above, i.e. by selection of a minimal spreading factor required for insuring reception (i.e. demodulation of the received signal) in combination with a lowest constellation modulation and a lowest coding rate that may be supported in a communication system. Considering a first station, which receives a signal at a relatively high SNR level, e.g. above −4 dB. This first station may optimally receive a data block with no spreading (i.e. a spreading factor of 1) using a strong modulation (low constellation) and a low coding rate (for example, BPSK rate 1/4, thus having 0.25 data bits per symbol). A second station may receive the same signal at an SNR level of −7 dB. This second station may optimally receive a data block with a spreading gain of 2 (3 dB) and using, for example, a BPSK rate 1/4 MODCOD. A third station may receive the same signal at an SNR as low as −14 dB. This third station may optimally receive a data block with a spreading gain of 10 (10 dB) and using, for example, a BPSK rate 1/4 MODCOD. Within the same network, yet a forth station may have a good link and may receive the same signal at high SNR level, for instance 8 dB. For this forth station, the ratio of data bits per symbol may be increased, e.g. by using an 8 PSK rate 2/3 MODCOD (thus having 2 data bits per symbol). It is important to observe that the spreading gain may be the minimal factor that allows detection. For instance, at SNR of −7 dB, spreading gain of 2 (3 dB) with a BPSK rate 1/4 MODCOD may be optimally used, yielding a total of 0.25/2=0.125 data bits per symbol. However, using a spreading gain of 30 (15 dB) may improve the SNR after spreading gain to 8 dB and allow use of an 8 PSK rate 2/3 MODCOD, but the ratio of data-bits per symbol would be 2/30=0.066, i.e. about half the number of bits per symbol that may be fitted into the same channel under the same reception conditions by selecting a minimal spreading gain.

In another aspect of the invention, an ASCM signal may be used in a satellite communication system for at least the purpose of enabling adaptive operation. Data destined to a receiving station may be transmitted in one or more transmission blocks using spreading (e.g. repetitions), coding and modulation characteristics that may be optimized in accordance with a reception quality (e.g. measurable as SNR) at which the signal is received at the receiving station. If a first receiving station and a second receiving station receive the signal at different reception quality levels, the data sent to the first receiving station may be transmitted using one set of spreading, coding and modulation characteristics, while data transmitted to the second receiving station, either over the same channel or over a different channel, may be transmitted using a different set of spreading, coding and modulation characteristics, wherein each set of spreading, coding and modulation characteristics may be optimized in accordance with a reception quality level at which the signal is received at the respective receiving station.

Furthermore, in some embodiments of said satellite communication system, a station configured for transmitting an ASCM signal may be further configured to use spreading only with some modulation and coding combinations (MODCOD). For example, spreading may be used only with one or two MODCOD combinations, e.g. MODCOD combinations characterized by a low order modulation and the lowest coding rates, for at least the purpose of potentially improving or even maximizing the transmitted throughput.

In some further embodiments, said satellite communication system may be configured to use spreading by repetitions. A station configured for transmitting an ASCM signal may be further configured to signal each MODCOD combination that may be combined with repetitions using two signaling combinations (e.g. two DBD codes as previously described). A first signaling combination may indicate a MODCOD and that the applicable encoded data block is a single replica, but not the last replica of an encoded data block. A second signaling combination, which is different from the first combination, may indicate the same MODCOD as the first signaling combination, but also that the applicable encoded data block is a last replica.

In some embodiments of the invention, the satellite communication network described above may be a point-to-point network (e.g. implementing a Single Channel per Carrier (SCPC)). The satellite communication network may comprise a first station (station A) and a second station (station B). Station A may be configured to transmit a forward channel signal towards a satellite, wherein the transmitted signal may be an ASCM signal. The satellite may amplify the forward channel signal, modify its frequency and transmit it back to earth towards station B. Similarly, Station B may be configured to transmit a return channel signal towards station A via the same satellite, wherein the return channel signal may be an ASCM signal. Each station may be configured to periodically (e.g. at predefined intervals) and/or occasionally (e.g. upon detecting a change in reception quality) transmit reception quality information (e.g. in terms of SNR, C/N, $E_S/N_0$ or any other applicable term) regarding its received signal to the far-end station, i.e. station B may be configured to inform station A of the quality at which it receives the forward channel signal and station A may be configured to inform station B of the quality at which it receives the return channel signal. In response to receiving reception quality information from the other station, each station may be further configured to change any of one or more spreading characteristics, one or more coding rate characteristics and one or more modulation characteristics of the signal it transmits in accordance with the reception quality information received from the other station, for at least the purpose of potentially improving or even maximizing data throughput in its transmitted channel.

Thus, in clear sky conditions (which may be present most of the time), the adaptive method described above may result in transmitting using spreading, coding and modulation characteristics which allow a relatively high number of data bits per symbol. On the other hand, when the satellite link is under fade conditions (e.g. when it rains), the links between station A and station B may be maintained, as each station may change its transmission characteristics and use a more robust scheme, which may be more suitable for reception at lower reception quality levels. Thus instead of keeping spares "for a rainy day", the satellite link may offer higher throughput most of the time and reduced throughput only when there is a real need for that, e.g. for keeping the data link alive during bad link conditions.

In another embodiment of the invention, the satellite communication network previously described may be a point-to-multipoint network. The satellite communication network may comprise a multiplicity of stations, whereas one of the stations may be configured as a hub and the other stations may be configured as remote terminals, e.g. terminals C and D. The hub station may be configured to transmit a forward channel signal towards a satellite, wherein the transmitted signal may be an ASCM signal. The satellite may amplify the forward channel signal, modify its frequency and transmit it back to earth towards the multiplicity of terminals, e.g. terminals C and D, which may be configured to receive it. Terminals C and D may be configured to transmit return channel signals towards the hub station. In some embodiments, the return channel signals may be transmitted as bursts in accordance with a Multi-Frequency Time Division Multiple Access (MF-TDMA) access scheme or any other applicable access scheme.

Furthermore, each terminal may be configured to periodically (e.g. at predefined intervals) and/or occasionally (e.g. upon detecting a change in reception quality) transmit information to the hub station (e.g. over a return channel) regarding the reception quality level (e.g. measured as SNR, C/N, $E_S/N_0$ or as any other applicable measurement) at which the terminal receives the forward channel signal. The hub station may be configured to transmit data over the forward channel to a terminal using spreading characteristics, coding rate characteristics and modulation characteristics optimized in accordance with reception quality information received from the terminal, for at least the purpose of maximizing data throughput in the forward channel. Consequently, data destined to terminal C may be transmitted over the forward channel using one set of spreading, coding and modulation characteristics, while data transmitted to terminal D over the same forward channel may be transmitted using a different set of spreading, coding and modulation characteristics, wherein each set of spreading, coding and modulation characteristics may be optimized in accordance with reception quality levels at which the forward channel signal is received at the respective terminals.

In some further embodiments of the invention, each remote terminal in the above-described point-to-multipoint network may be configured to transmit its return channels as an ASCM continuous signal, i.e. the hub station may be configured to receive multiplicity of ASCM return channel signals. The hub station may be configured to periodically (e.g. at predefined intervals) and/or occasionally (e.g. upon detecting a change in reception quality) transmit information to a terminal (e.g. over the forward channel) regarding the reception quality level at which the hub station receives the return channel signal transmitted by the terminal. The terminal may be configured to transmit data over the return channel to the hub station using spreading factor characteristics, coding rate characteristics and modulation characteristics optimized in accordance with reception quality information received from the hub station, for at least the purpose of potentially improving or even maximizing data throughput in the return channel.

It should be appreciated by anyone skilled in the art that the above described embodiments are merely implementation examples of the novel idea of Adaptive Spreading Coding and Modulation transmission. Other implementations of ASCM transmissions may be envisaged without departing from the true spirit and scope of the present invention.

As will be appreciated by one of skill in the art upon reading the following disclosure, various aspects described herein may be embodied as methods, systems, apparatus (e.g., components of a satellite communication network), and/or computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. In a satellite communication system comprising at least one transmitting station configured to transmit and at least one receiving station configured to receive via a satellite, a method comprising:

encoding a plurality of data blocks for transmission to a receiving station;

forming a plurality of transmission blocks, each transmission block comprising an encoded data block and a data block descriptor field, said data block descriptor field indicating at least one of a modulation characteristic or an error-correction coding characteristic for the encoded data block within the same transmission block, wherein each of the transmission blocks has at least one spectrum spreading characteristic, at least one modulation characteristic, and at least one error-correction coding characteristic, and wherein the plurality of transmission blocks are all of a constant length measured by transmission symbols; and transmitting a signal to the receiving station, wherein the signal is an adaptive spreading coding and modulation signal comprising the plurality of transmission blocks.

2. The method of claim 1, wherein the adaptive spreading coding and modulation signal is spread by a repetition technique, wherein at least one encoded data block is transmitted multiple times in multiple transmission blocks.

3. The method of claim 1, wherein the data block descriptor field further indicates one or more spectrum spreading characteristics.

4. The method of claim 1, wherein each transmission block further includes a predefined unique word field prefix.

5. The method of claim 4, wherein an encoded data block is spread, modulated and encoded in accordance with spectrum spreading, modulation and error correction coding characteristics indicated in a data block descriptor field preceding the encoded data block in the same transmission block.

6. The method of claim 4, wherein different combinations of spectrum spreading, modulation, and error-correction coding characteristics are represented by different data block descriptor codes, and wherein data block descriptor codes are represented or signaled by orthogonal code words over a sequence of symbols of predefined length.

7. The method of claim 4, wherein spectrum spreading characteristics are signaled in combination with only part of the modulation and error-correction coding characteristics combinations.

8. The method of claim 7, wherein the combinations of modulation and error-correction coding characteristics that are signaled in combination with spectrum spreading characteristics are those of a lowest modulation constellation and of a lowest coding rates.

9. The method of claim 4, wherein the spectrum spreading characteristics are spreading by repetitions attributes and wherein each modulation and coding combination associated with spreading characteristics is represented by two different data block descriptor codes.

10. The method of claim 9, wherein a first of the two data block descriptor codes indicates a modulation and coding combination and that a corresponding encoded data block is a single replica but not a last replica, and a second of the two data block descriptor codes indicates a same modulation and coding combination as the first data block descriptor code and that a corresponding encoded data block is a last replica.

11. The method of claim 1, further comprising:
selecting spectrum spreading, modulation and error-correction coding characteristics for each transmission block based on reception conditions at the receiving station.

12. A satellite communication system comprising:
at least one transmitting station configured to transmit; and
at least one receiving station configured to receive via a satellite,
wherein a transmitting station is configured to transmit and a receiving station is configured to receive an adaptive spreading coding and modulation signal comprising a plurality of transmission blocks, each transmission block comprising an encoded data block and a data block descriptor field, said data block descriptor field indicating at least one of a modulation characteristic or an error-correction coding characteristic for the encoded data block within the same transmission block,
wherein each of the transmission blocks has at least one spectrum spreading characteristic, at least one modulation characteristic, and at least one error-correction coding characteristic, and
wherein the plurality of transmission blocks are all of a constant length measured by transmission symbols.

13. The satellite communication system of claim 12, wherein
each encoded data block is spread, modulated and encoded in accordance with spectrum spreading, modulation and error correction coding characteristics indicated in the data block descriptor field preceding the encoded data block in the same transmission block.

14. The satellite communication system of claim 13, wherein different combinations of spectrum spreading, modulation and error-correction coding characteristics are represented by different data block descriptor codes.

15. The satellite communication system of claim 14, wherein:
the transmitting station is further configured to transmit and the receiving station is further configured to receive data block descriptor codes as orthogonal code words over a sequence of symbols of predefined length; and
the receiving station is configured to detect data block descriptor codes using a non-coherent detector.

16. The satellite communication system of claim 14, wherein the communication system is configured to map only a subset of modulation, error-correction coding and spreading attributes combinations into data block descriptor codes.

17. The satellite communication system of claim 13, wherein the transmitting station is further configured to:
determine spreading, modulation and coding characteristics combination in accordance with reception quality at which the transmitted signal is received at the receiving station; and
transmit data to the receiving station using said determined spreading, modulation and coding characteristics combination.

18. The satellite communication system of claim 13, wherein the transmitting station is further configured to combine spectrum spreading characteristics with only part of the modulation and error-correction coding characteristics combinations, and wherein the combinations of modulation and error-correction coding characteristics that are combined with spectrum spreading characteristics are those of the lowest modulation constellation and of the lowest coding rates.

19. The satellite communication system of claim 13, wherein the transmitting station and the receiving station are configured to use spreading by repetitions, wherein at least one encoded data block is transmitted multiple times in multiple transmission blocks.

20. The satellite communication system of claim 19, wherein the transmitting station is further configured to signal each modulation and coding combination associated with spreading characteristics using two different data block descriptor codes, wherein:
a first data block descriptor code indicates a modulation and coding combination and that a corresponding encoded data block is a single replica but not a last replica; and
a second data block descriptor code indicates a same modulation and coding combination as the first data block descriptor code and that a corresponding encoded data block is a last replica.

21. The satellite communication system of claim 12, wherein the satellite communication system is configured in a point-to-point topology comprising at least a first station and a second station.

22. The satellite communication system of claim 21, wherein:
the first station is configured to transmit and the second station is configured to receive a forward adaptive spreading coding and modulation signal;
the second station is configured to transmit and the first station is configured to receive a return adaptive spreading coding and modulation signal, wherein the return signal is transmitted over a different channel than the forward signal;
each of the first and the second stations is further configured to transmit reception quality information regarding the signal it receives from the other station and to receive reception quality information regarding the signal it transmits towards the other station; and
each of the first and the second stations is further configured to change any of one or more spreading characteristics, one or more coding rate characteristics and one or more modulation characteristics of the signal it transmits in accordance with the reception quality information received from the other station.

23. The satellite communication system of claim 12, wherein the satellite communication system is configured in a point-to-multipoint topology comprising at least one station configured as a hub and one or more stations configured as terminals.

24. The satellite communication system of claim 23, wherein:
- the hub station is configured to transmit and the terminals are configured to receive a forward adaptive spreading coding and modulation signal;
- each terminals is configured to transmit a return signal and the hub is configured to receive one or more return signals from one or more terminals, wherein a return signal is transmitted as one or more bursts in accordance with an access scheme;
- each terminal is further configured to transmit and the hub is further configured to receive reception quality information regarding the received forward signal; and
- the hub is further configured to transmit data to terminals over the forward signal using spreading characteristics, coding rate characteristics and modulation characteristics, which are determined in accordance with the reception quality information received from the terminals.

25. The satellite communication system of claim 23, wherein:
- the hub station is configured to transmit and the terminals are configured to receive a forward adaptive spreading coding and modulation signal;
- each terminal is configured to transmit a return signal and the hub is configured to receive one or more return signals from one or more terminals, wherein the one or more return signals are adaptive spreading coding and modulation signals;
- each terminal is further configured to transmit and the hub is further configured to receive reception quality information regarding the received forward signal;
- the hub is further configured to transmit and each terminal is further configured to receive reception quality information regarding the return signal of each terminal;
- the hub is further configured to transmit data to terminals over the forward signal using spreading characteristics, coding rate characteristics and modulation characteristics, which are determined in accordance with the reception quality information received from the terminals; and
- terminals are further configured to transmit data to the hub over return signals using spreading characteristics, coding rate characteristics and modulation characteristics, which are determined in accordance with the reception quality information received from the hub.

26. In a satellite communication system comprising at least one transmitting station configured to transmit and at least one receiving station configured to receive via a satellite, a method comprising:
- receiving a signal at the receiving station, wherein the signal is an adaptive spreading coding and modulation signal comprising a plurality of transmission blocks, each transmission block comprising an encoded data block and a data block descriptor field, said data block descriptor field indicating at least one of a modulation characteristic or an error-correction coding characteristic for the encoded data block within the same transmission block,
  - wherein each of the transmission blocks has at least one spectrum spreading characteristic, at least one modulation characteristic, and at least one error-correction coding characteristic, and
  - wherein the plurality of transmission blocks are all of a constant length measured by transmission symbols; and
- decoding a plurality of encoded data blocks received in the adaptive spreading coding and modulation signal, wherein the decoding comprises using a data block descriptor field in each of the plurality of transmission blocks to decode an encoded data block in the same transmission block.

27. The method of claim 26, wherein the encoded data blocks are spectrum spread by repetitions, the method further comprising:
- determining a modulation used for modulating a received transmission block by detecting a data block descriptor code included in a data block descriptor field;
- removing the modulation from received symbols corresponding to the data block descriptor field in accordance with the determined modulation, to produce non-modulated symbols corresponding to the data block descriptor field;
- summing coherently the non-modulated symbols corresponding to the data block descriptor field with non-modulated symbols corresponding to data block descriptor fields of other transmission blocks including other replicas of a same encoded data block, to produce an enhanced preamble; and
- using the enhanced preamble for determining an initial phase reference for demodulation, decoding or both of the corresponding data block, after the corresponding data block has gained a spreading gain.

28. The method of claim 27, wherein each transmission block further includes a predefined unique word field prefix, the method further comprising:
- removing the modulation from received symbols corresponding to the unique word field in accordance with said determined modulation and in accordance with the predefined unique word field, to produce non-modulated symbols corresponding to the unique word field;
- summing coherently the non-modulated symbols corresponding to the unique word field with non-modulated symbols corresponding to unique word fields of other transmission blocks including replicas of an encoded data block, to produce an enhanced preamble, either alone or together with similarly processed symbols of the data block descriptor field; and
- using the enhanced preamble for determining an initial phase reference for demodulation, decoding or both of the corresponding data block, after the corresponding data block has gained a spreading gain.

29. The method of claim 26, wherein the adaptive spreading coding and modulation signal is spread by a repetition technique, wherein at least one encoded data block is transmitted multiple times in multiple transmission blocks.

30. The method of claim 26, wherein the data block descriptor field further indicates one or more spectrum spreading characteristics, and wherein only a subset of a set of different combinations of spectrum spreading, modulation, and error-correction coding characteristics supported by the communication system are mapped to different data block descriptor codes.

* * * * *